(12) United States Patent
Su

(10) Patent No.: US 6,963,153 B1
(45) Date of Patent: Nov. 8, 2005

(54) HOUSING OF MOTOR

(76) Inventor: Wei-Chung Su, No.56, Sec. 2, Fengshi Rd., Fengyuan City, Taichung County 420 (TW)

( * ) Notice: Subject to any disclaimer, the term of this patent is extended or adjusted under 35 U.S.C. 154(b) by 0 days.

(21) Appl. No.: 10/856,850

(22) Filed: Jun. 1, 2004

(51) Int. Cl.$^7$ .............................................. H02K 5/00
(52) U.S. Cl. ........................................ 310/89; 310/91
(58) Field of Search ............................... 310/89, 91, 51

(56) References Cited

U.S. PATENT DOCUMENTS

| 3,787,014 | A | * | 1/1974 | Story et al. | ................. | 248/558 |
| 5,877,576 | A | * | 3/1999 | CoChimin | .................. | 310/254 |
| 6,091,173 | A | * | 7/2000 | Byrd | ............................ | 310/85 |
| 6,483,213 | B1 | * | 11/2002 | Hsu | .......................... | 310/68 R |
| 6,800,975 | B2 | * | 10/2004 | Long | ............................ | 310/89 |

* cited by examiner

*Primary Examiner*—Darren Schuberg
*Assistant Examiner*—Nguyen Hanh
(74) *Attorney, Agent, or Firm*—Bacon & Thomas

(57) ABSTRACT

A housing of a motor includes a barrel having fins on an outer surface thereof and stands on a bottom of the outer surface for mounting the motor onto a predetermined plane horizontally. A rear lid is mounted at a rear end of the barrel and has an axle hole at a center thereof. A front lid is mounted at a front end of the barrel and ahs an axle hole at a center thereof. And, a front disk that has a diameter greater than that of the barrel is detachably fastened to the front lid. The front disk is provided with fastening holes for mounting the motor onto a predetermined plane vertically.

7 Claims, 10 Drawing Sheets

HOUSING OF MOTOR

BACKGROUND OF THE INVENTION

1. Field of the Invention

The present invention relates generally to a motor, and more particularly to a housing of a motor, which is applied to both of the vertical motor and the horizontal motor.

2. Description of the Related Art

Conventional motors are classified into an IEC specification that is widely used in European and Japan and a NAMA specification that is widely used in U.S.A., and also are classified into vertical motors and horizontal motors depended on the installation posture of the motor.

The conventional vertical motor has a barrel and a front lid mounted at an end of the barrel, wherein the front lid has a greater diameter than the barrel and has a plurality of holes at a margin, the portion beyond the housing. Bolts are inserted into the holes of the front lid respectively to fasten the motor onto a predetermined plane. The conventional horizontal motor has a barrel and a stand mounted on an outer surface of the barrel. The stand is fastened onto a predetermined plane whereby the motor is fixed in a horizontal condition. The horizontal motor still has a front lid and a rear lid, which are respectively mounted at opposite ends of the barrel and have a same diameter. Generally, the front lid used in the vertical motor is greater in diameter then the front lid used in the horizontal motor.

Any series motor has both of the vertical type and the horizontal type, so that the manufacturer has to prepare two kinds of front lids for the vertical and horizontal motors. It has a higher cost to store the different types of motors.

There was a motor, which is applied to both of the vertical type and the horizontal type, in Europe. Such motor has a greater front lid like the vertical motor and a detachable stand mounted on a barrel thereof. The motor can be fastened through the stand like the horizontal motor. Alternatively, the motor can be fastened through the front lid when the stand is detached from the motor. Such motor has the greater front lid and it looks strange to consumers, so that the motor is not popular in the market. People still buy the vertical or horizontal motors rather than aforesaid motor.

In addition, if a motor can be fastened as both of the vertical and horizontal motor, the stand must be higher so as to elevate the front lid off the ground while the motor is fastened through the stand. Such motor with the higher stand does not meet the requirement of the IEC specification.

SUMMARY OF THE INVENTION

The primary objective of the present invention is to provide a housing of a motor, which is applied to both of the vertical and horizontal motor.

Another objective of the present invention is to provide a housing of a motor, which has no aforesaid drawbacks.

According to the objectives of the present invention, a housing of a motor comprises a barrel having a plurality of fins on an outer surface thereof and a plurality of stands on a bottom of the outer surface for mounting the motor onto a predetermined plane horizontally. A rear lid is mounted at a rear end of the barrel and has an axle hole at a center thereof. A front lid is mounted at a front end of the barrel and has an axle hole at a center thereof. A front disk that has a diameter greater than that of the barrel is detachably fastened to the front lid through at least a fastener. The front disk is provided with a plurality of fastening holes for mounting the motor onto a predetermined plane vertically.

DETAILED DESCRIPTION OF THE INVENTION

Figure 1:
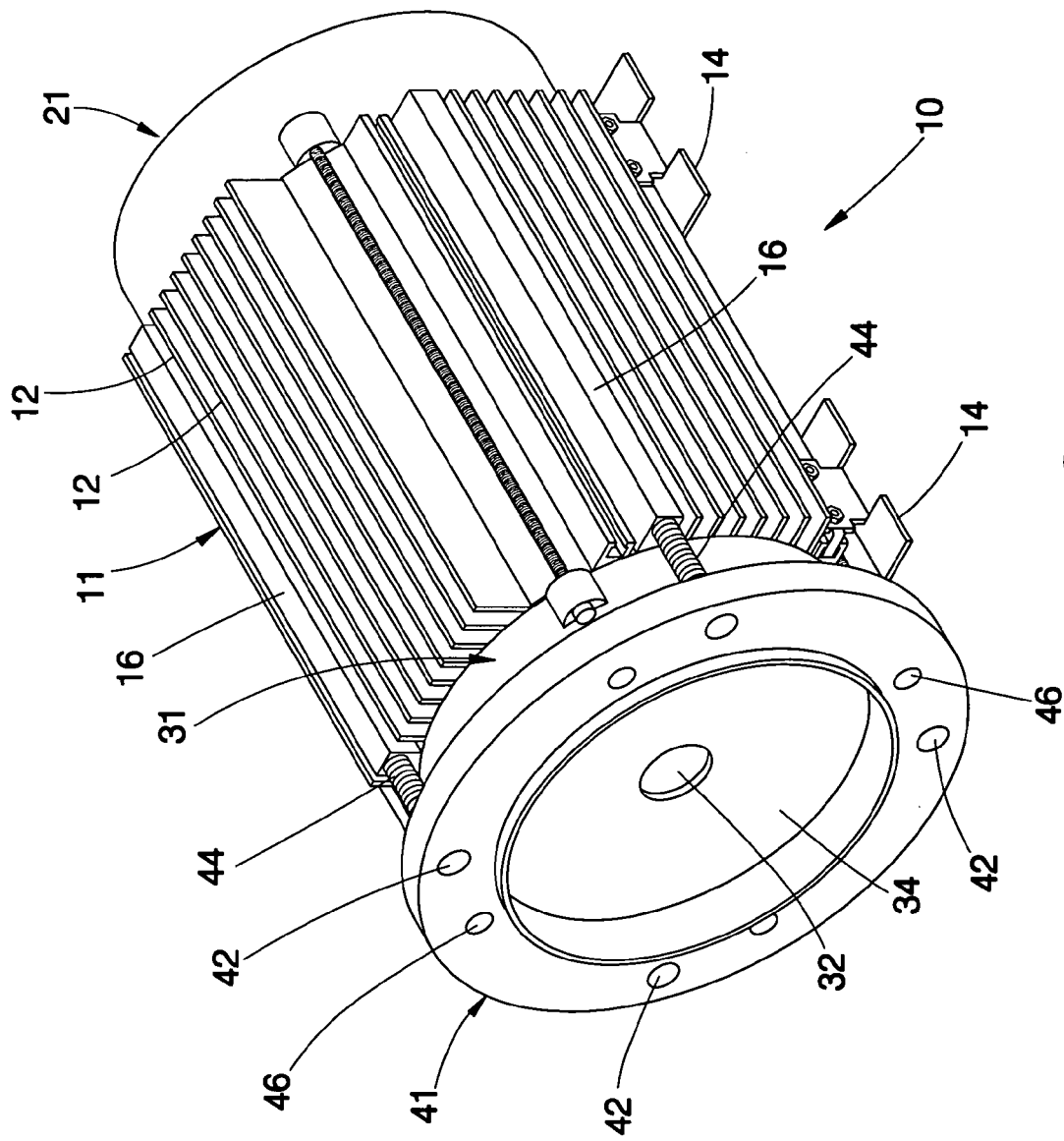
FIG. 1 is a perspective view of a first preferred embodiment of the present invention.
Figure 2:
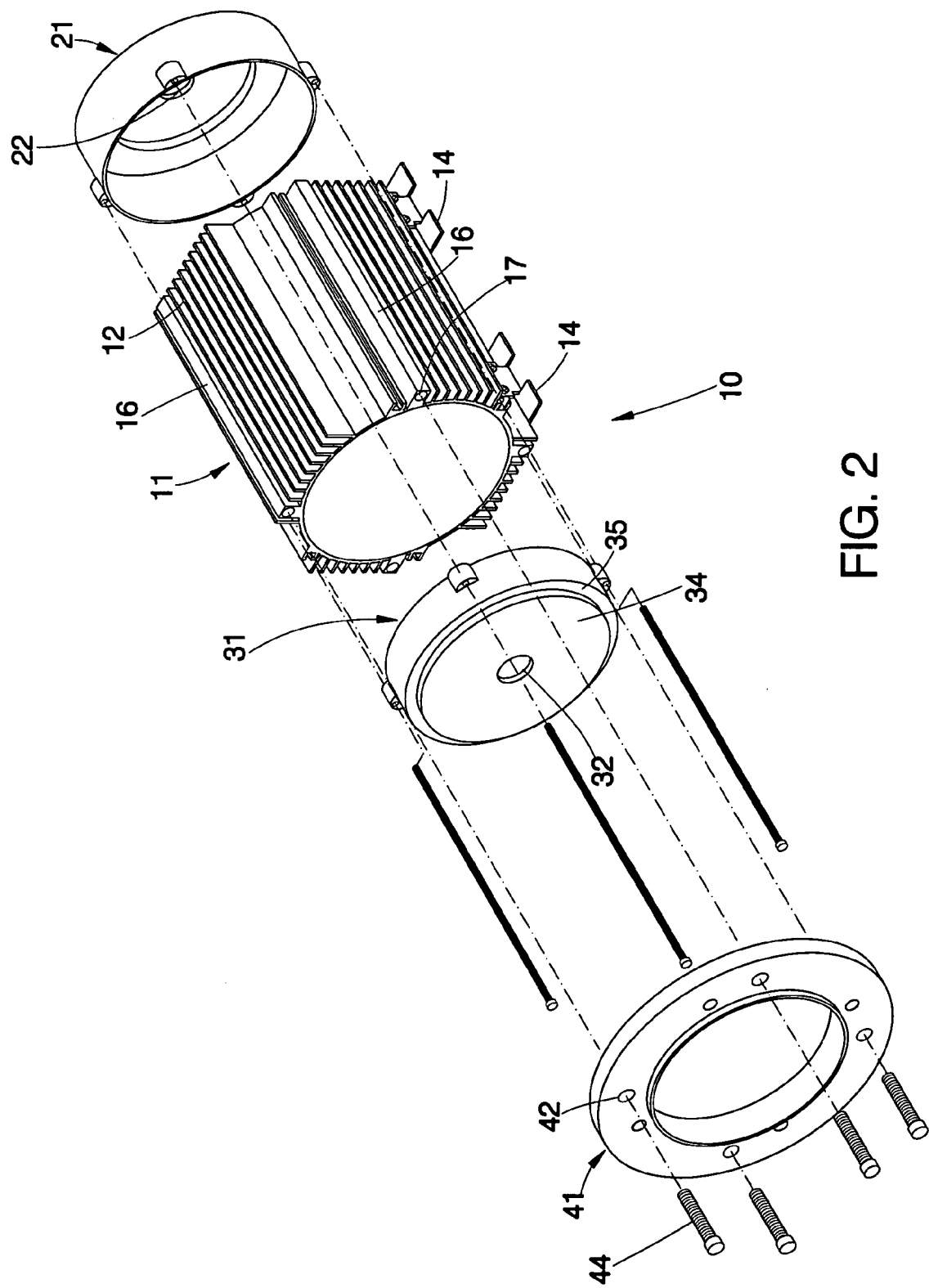
FIG. 2 is an exploded view of the first preferred embodiment of the present invention.

As shown in FIG. 1 to FIG. 2, a housing 10 of a motor of the first preferred embodiment of the present invention comprises a barrel 11, a rear lid 21, a front lid 31 and a front disk 41.

The barrel 11 is open at opposite ends thereof having a plurality of fins 12 on an outer surface thereof to be the heat sink and a plurality of stands 14 on a bottom of the outer surface to be fastened on to a predetermined plane. A stator and a rotor are received in the barrel 11. The stator and the rotor are conventional devices, so that we would not describe their detail here.

The rear lid 21 is mounted at the rear end of the barrel 11 having an axle hole 22 at a center thereof.

The front lid 31 is mounted at the front end of the barrel 11 having an axle hole 32 at a center thereof. A spindle (not shown) is inserted into the axle holes 22 and 32 of the rear lid 21 and the front lid 31.

The characters of the present invention are described hereunder:

The barrel 11 has a plurality of elongated ribs 16 on the outer surface and between the fins 12. Each of the ribs 16 respectively has a thread hole 17 at a front end thereof.

The front lid 31 has a hill portion 34 and an annular stop plane 35 around the hill portion 34. The hill portion 34 has a diameter smaller than the barrel 11.

The front disk 41 has a diameter greater than the barrel 11 and has a hole at a center thereof to be fitted to the hill portion 34 of the front lid 31. The front disk 41 has a sidewall of the hole attached on the hill portion 34 and has an interior side attached on the stop plane 35. The front disk 41 has a plurality of holes 42 aligned to the thread holes 17 of the ribs 16 respectively, so that fasteners 44, they are bolts in the present preferred embodiment, are screwed into the thread holes 17 respectively via the holes 42 to fasten the front disk 41 on the front lid 31. The front disk 41 is provided with a plurality of fastening holes 46 to mount the motor on a predetermined plane as the vertical motor.

Figure 3:
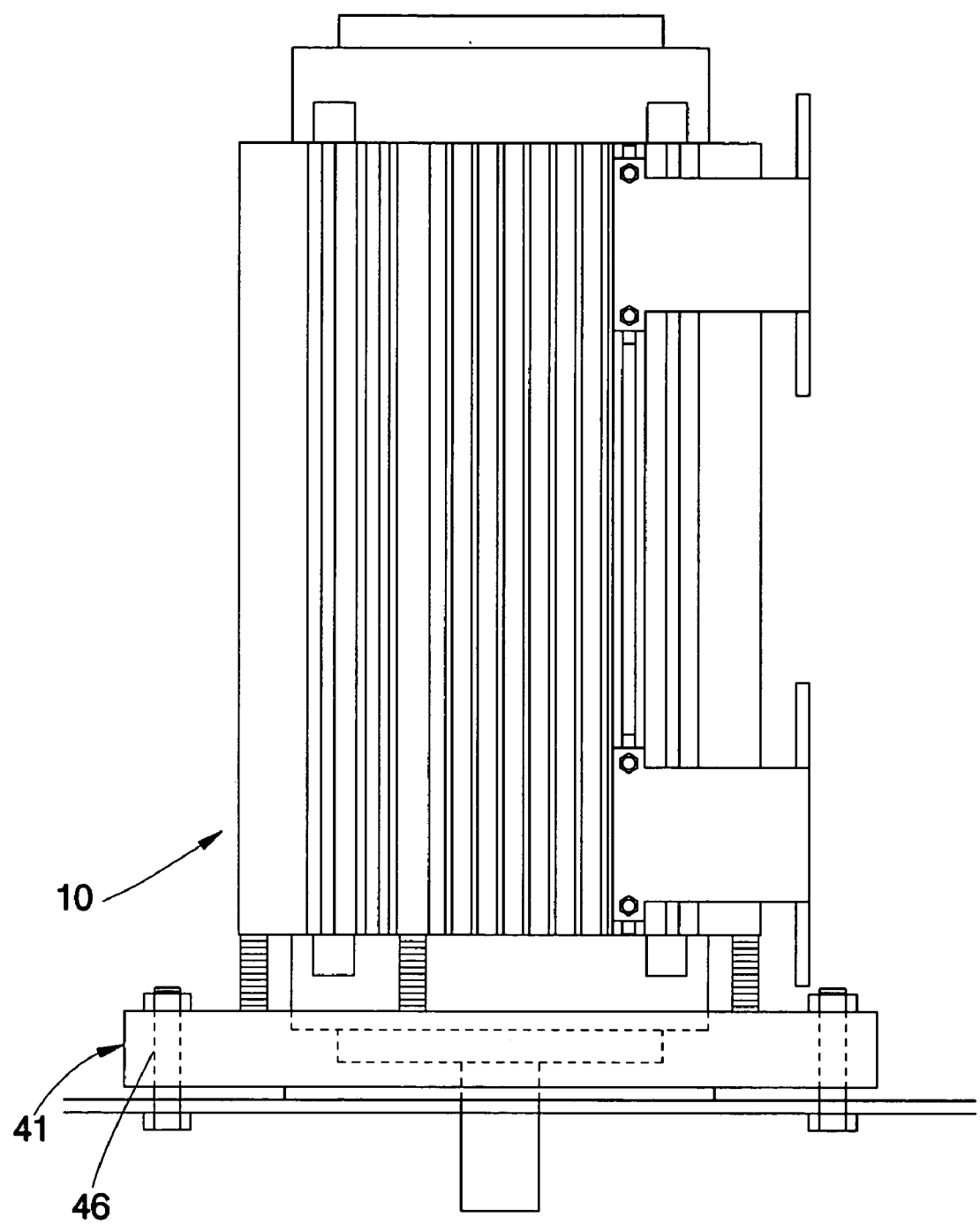
FIG. 3 is a perspective view of the first preferred embodiment of the present invention, showing the motor being mounted as the vertical motor.

As shown in FIG. 3, while the motor of the present invention is mounted as the vertical motor, bolts or other suitable fasteners are instated into the fastening holes 46 of the front disk 41 to mount the mount on the plane.

Figure 4:
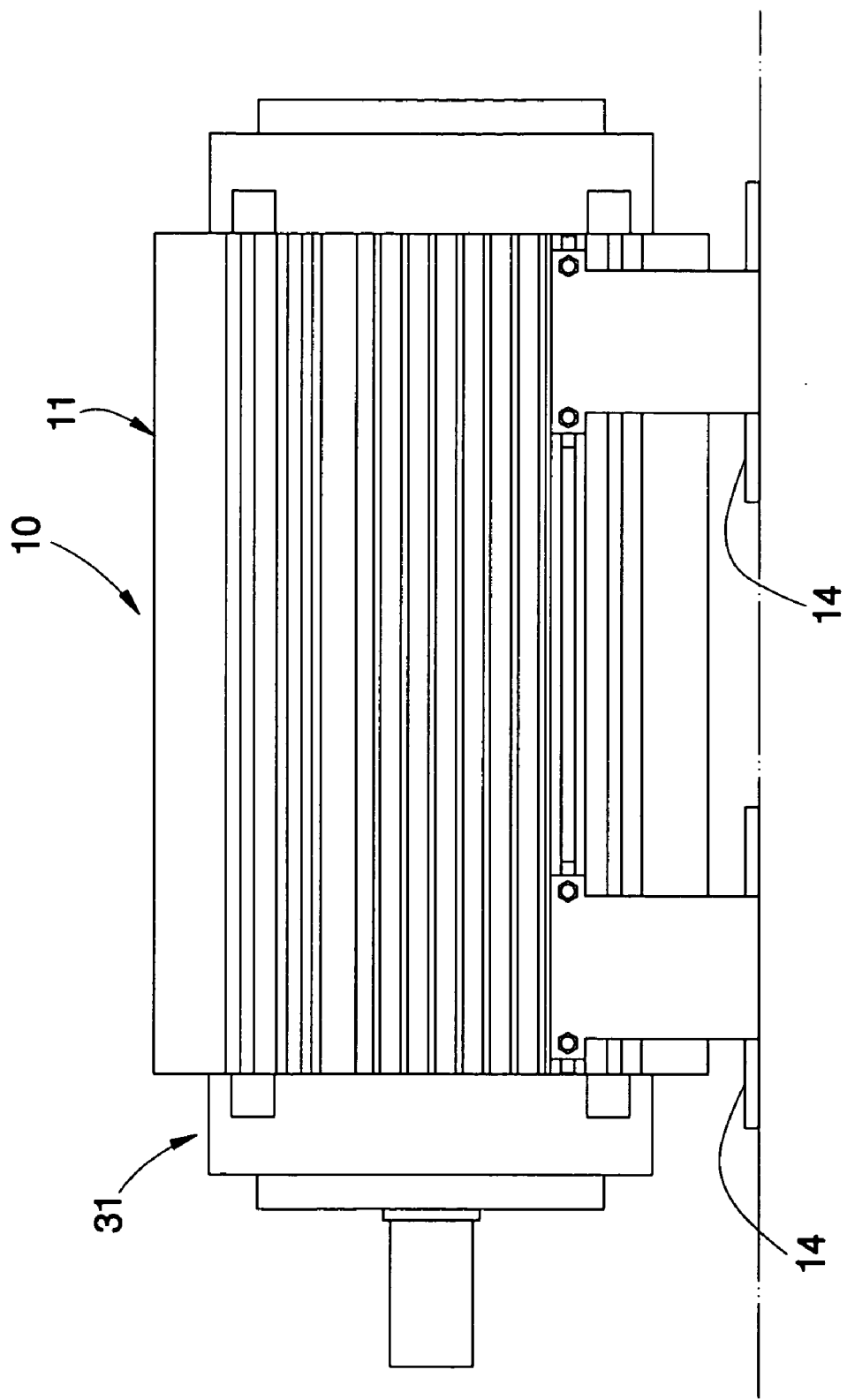
FIG. 4 is a perspective view of the first preferred embodiment of the present invention, showing the motor being mounted as the horizontal motor.

As shown in FIG. 1 and FIG. 4, while the motor of the present invention is mounted as the horizontal motor, the front disk 41 is removed first via loosing the fasteners 44 and the stands 14 of the barrel 11 are fastened to a predetermined plane via bolts or other suitable fasteners. The present invention provides the detachable front disk 41, which is the element making the motor of the present invention mounted in vertical, to skip the problem of the front disk 41 against the ground while the motor is mounted in horizontal.

Figure 5:
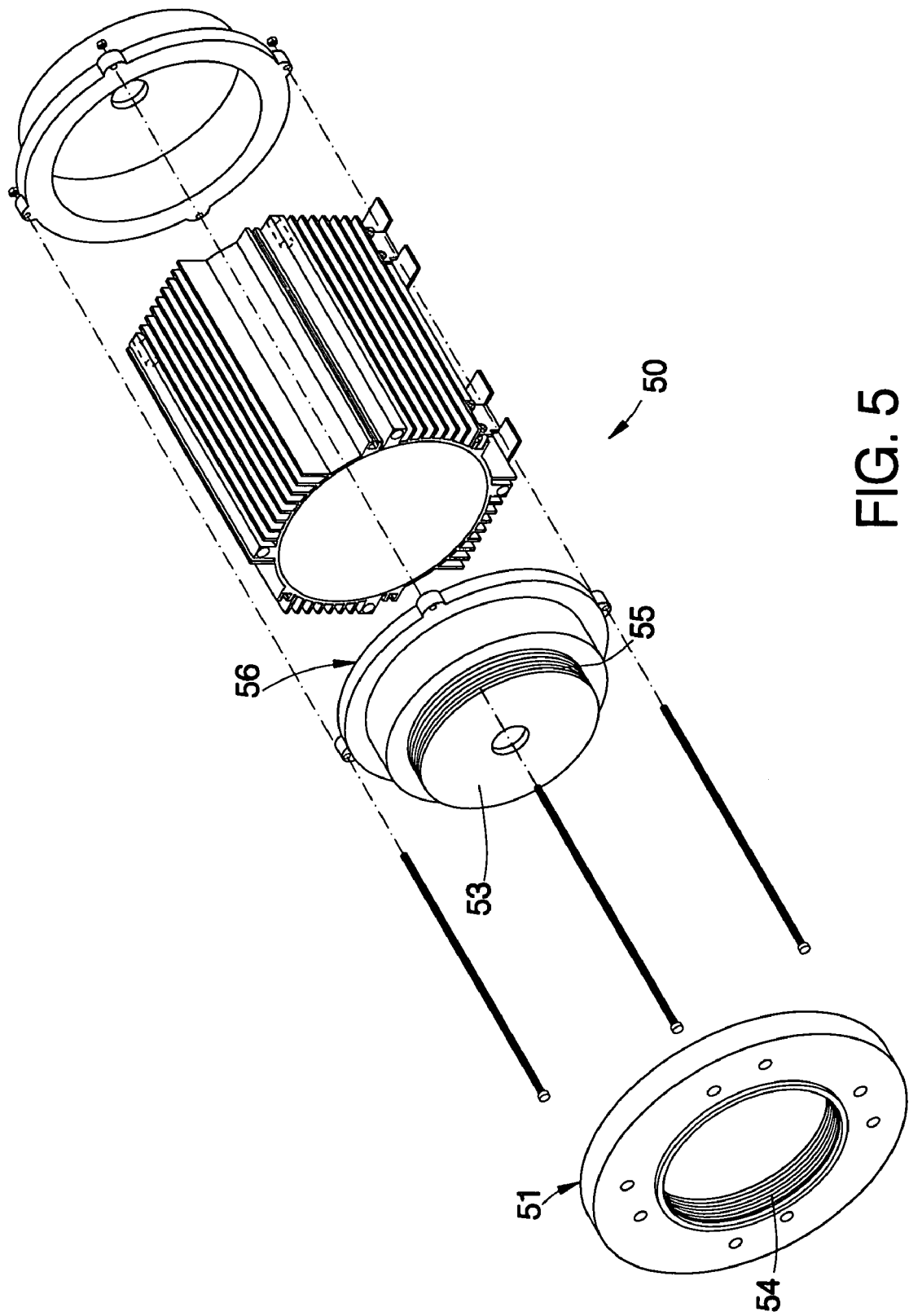
FIG. 5 is an exploded view of a second preferred embodiment of the present invention.

As shown in FIG. 5, a housing 50 of a motor of the second preferred embodiment is similar to the housing 10 of the first preferred embodiment, except that a front disk 51 is fitted to a hill portion 53 via two fasteners 54 and 55. In the present preferred embodiment, the fasteners 54 and 55 are threads provided on the hill portion 53 and a sidewall of a hole of the front disk 51. The front disk 51 is screwed to be fastened to or detached from a front lid 56.

The way of how to mount the motor of the second preferred embodiment in vertical or in horizontal is as same as the motor of the first preferred embodiment, so that we would not describe again.

Figure 6:
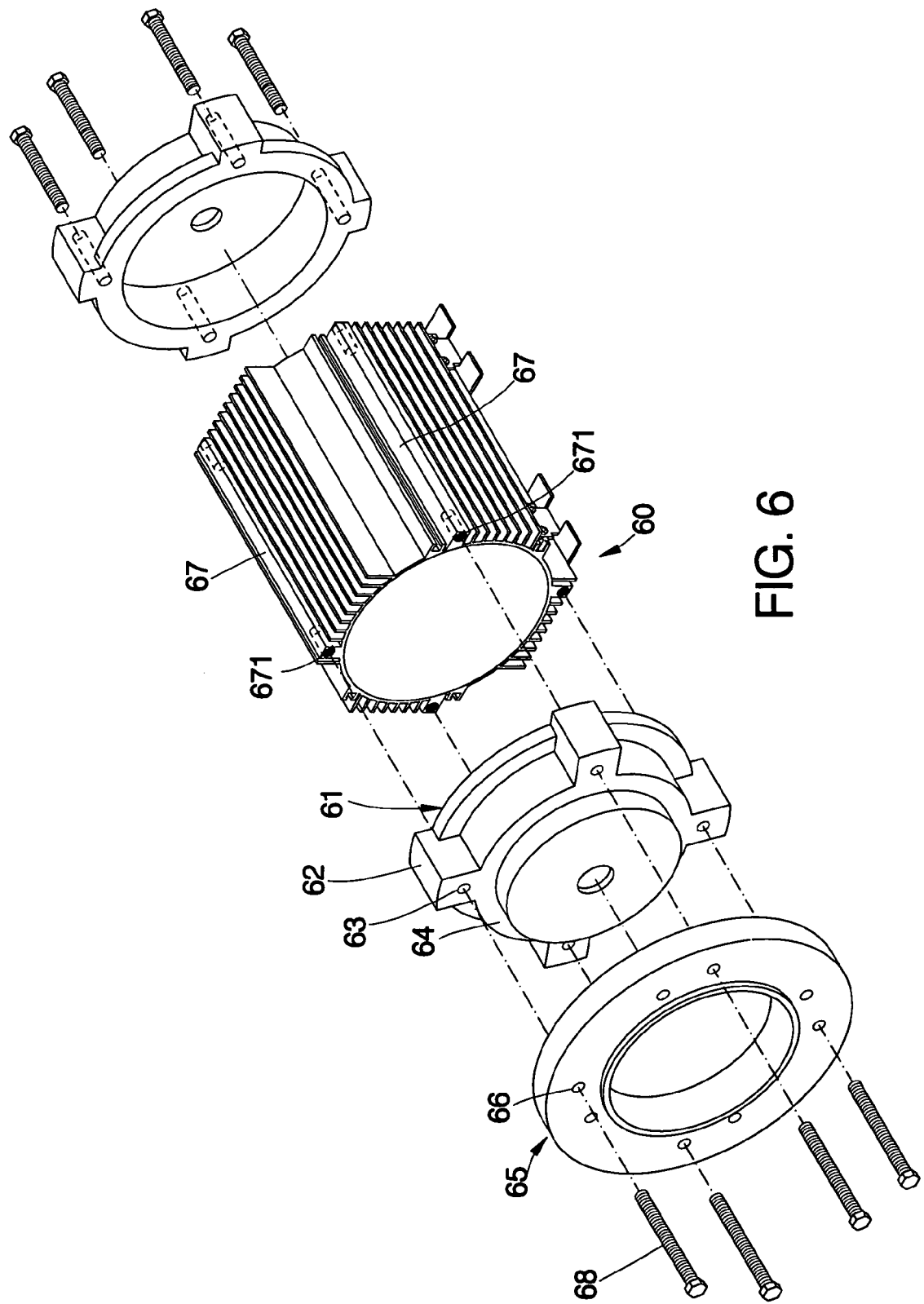
FIG. 6 is an exploded view of a third preferred embodiment of the present invention.

As shown in FIG. 6, a housing 60 of a motor of the third preferred embodiment is similar to the housing 10 of the first preferred embodiment, except that a front lid 61 has a plurality of flanges 62. Exterior ends of the flanges 62 and a stop plane 64 of the front lid 61 are located at the same plane. A front disk 65 is attached on both of the stop plane 64 and the exterior ends of the flanges 62. Each of the flanges 62 has a hole 63 aligned to thread holes 671 of ribs 67 respectively and the front disk 65 has holes 66 aligned to the holes 63 of the flanges 62 respectively. Fasteners 68, which are bolts, are respectively inserted into the holes 66 and 63 of the front disk 65 and front lid 61 and are screwed into the thread holes 671 of ribs 67. The front disk 65, therefore, is fastened on the front lid 61.

The way of how to mount the motor of the third preferred embodiment in vertical or in horizontal is as same as the motor of the first preferred embodiment, so that we would not describe again.

Figure 7:
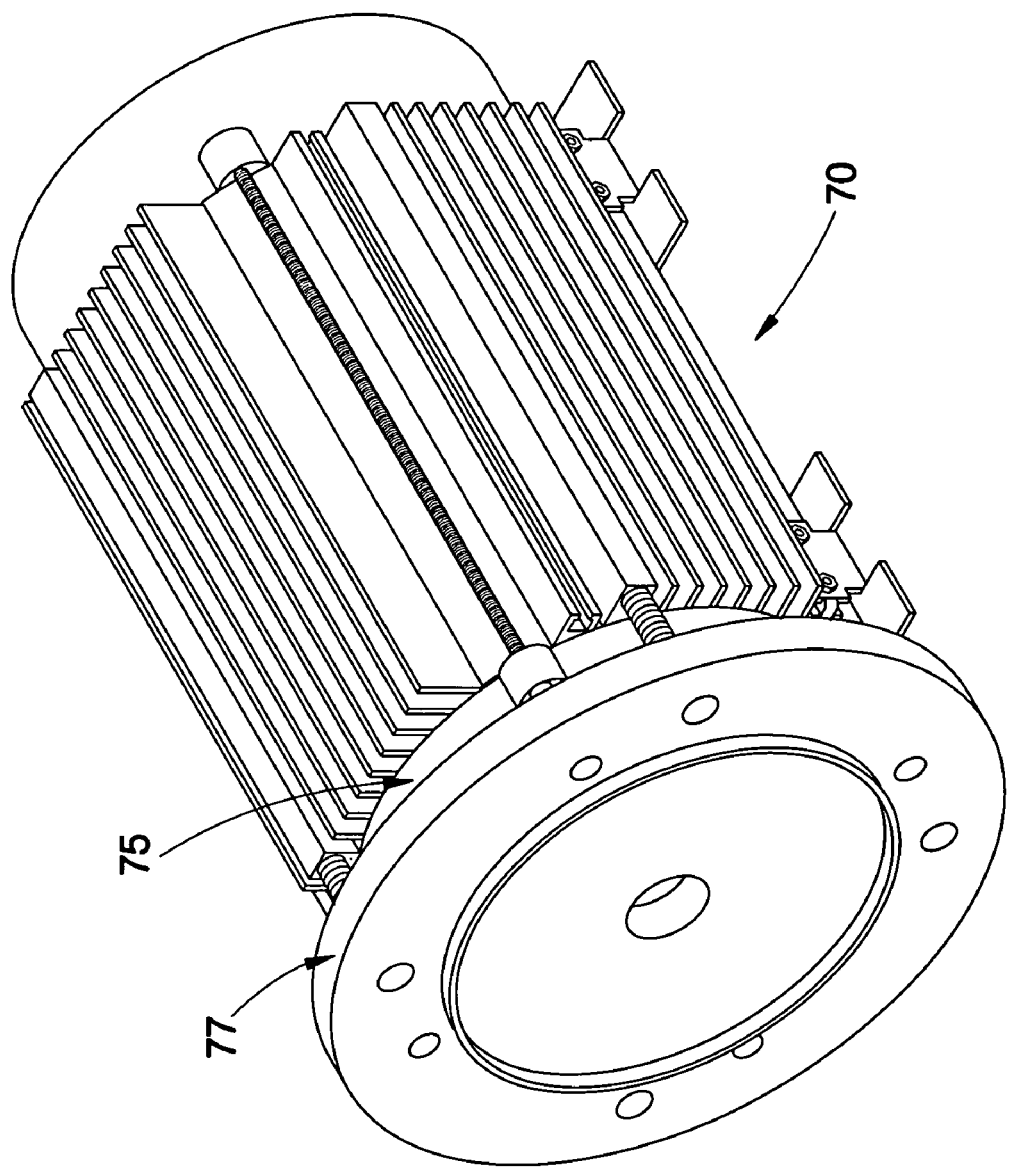
FIG. 7 is a perspective view of a fourth preferred embodiment of the present invention.
Figure 8:
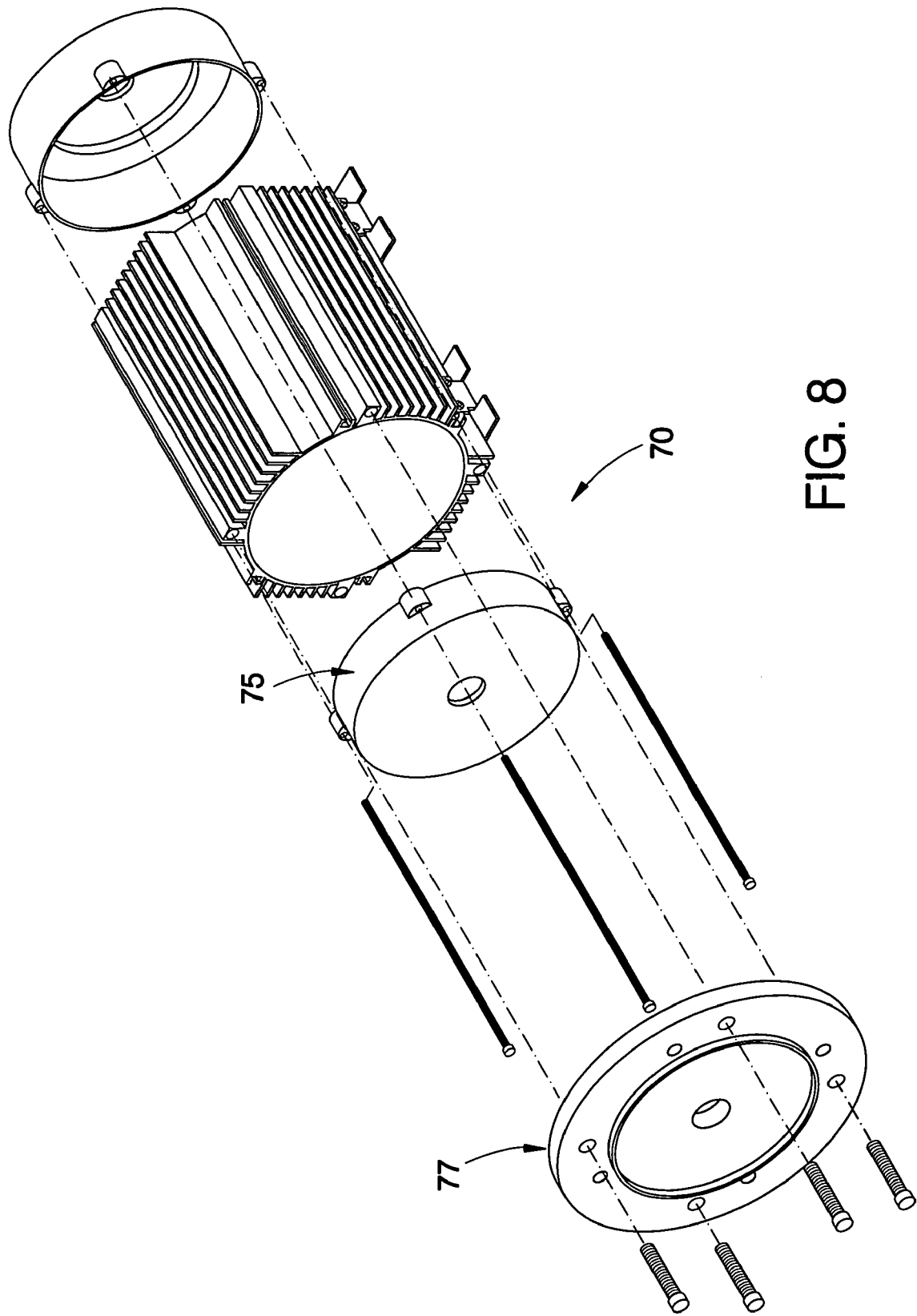
FIG. 8 is an exploded view of the fourth preferred embodiment of the present invention.

As shown in FIG. 7 and FIG. 8, a housing 70 of a motor of the fourth preferred embodiment is similar to the housing 10 of the first preferred embodiment, except that an end of a front lid 75 is a flat plane and an end of a front disk 77, on which the front lid 75 is attached, is a flat plane too.

The way of how to mount the motor of the fourth preferred embodiment in vertical or in horizontal is as same as the motor of the first preferred embodiment, so that we would not describe again.

Figure 9:
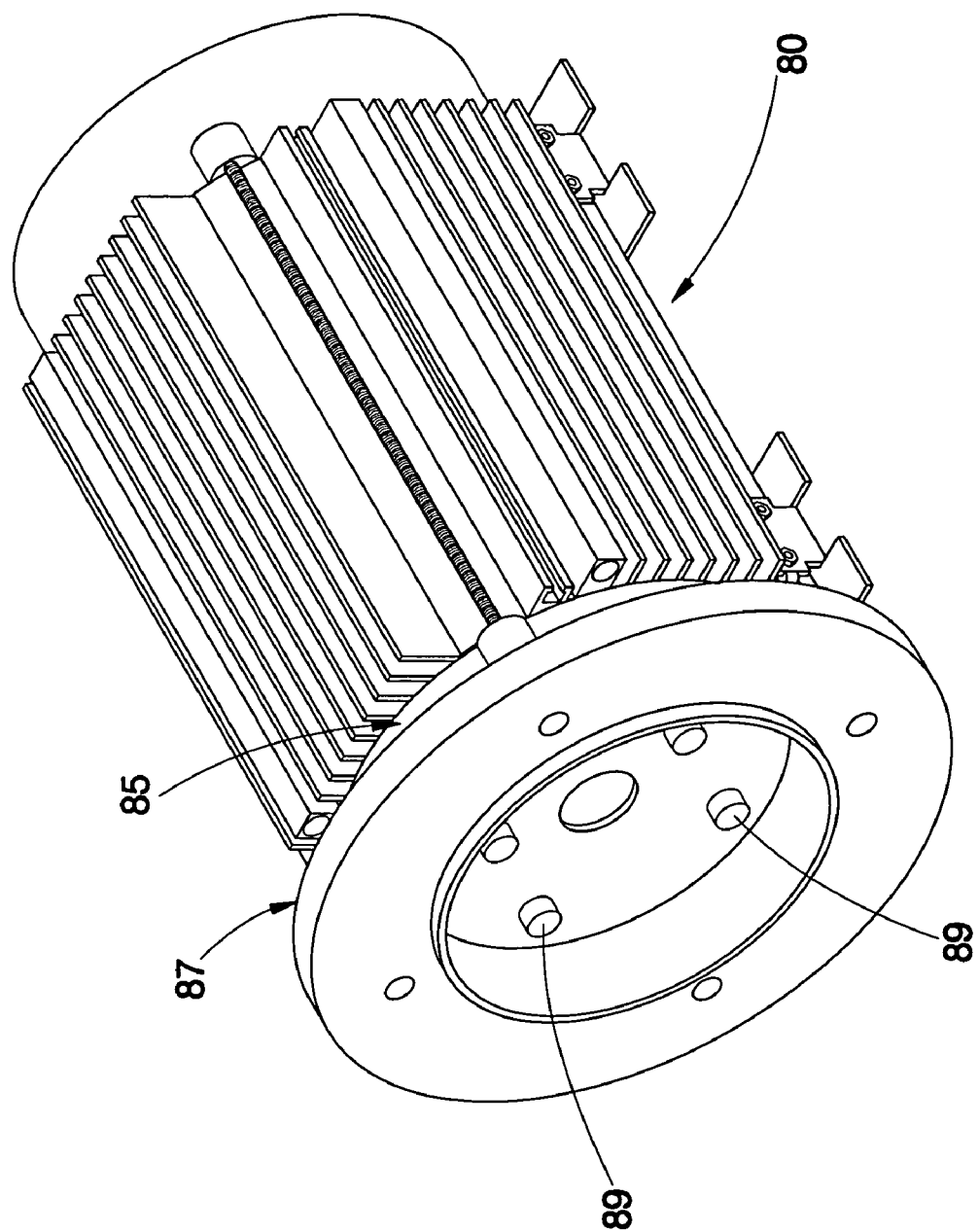
FIG. 9 is a perspective view of a fifth preferred embodiment of the present invention.
Figure 10:
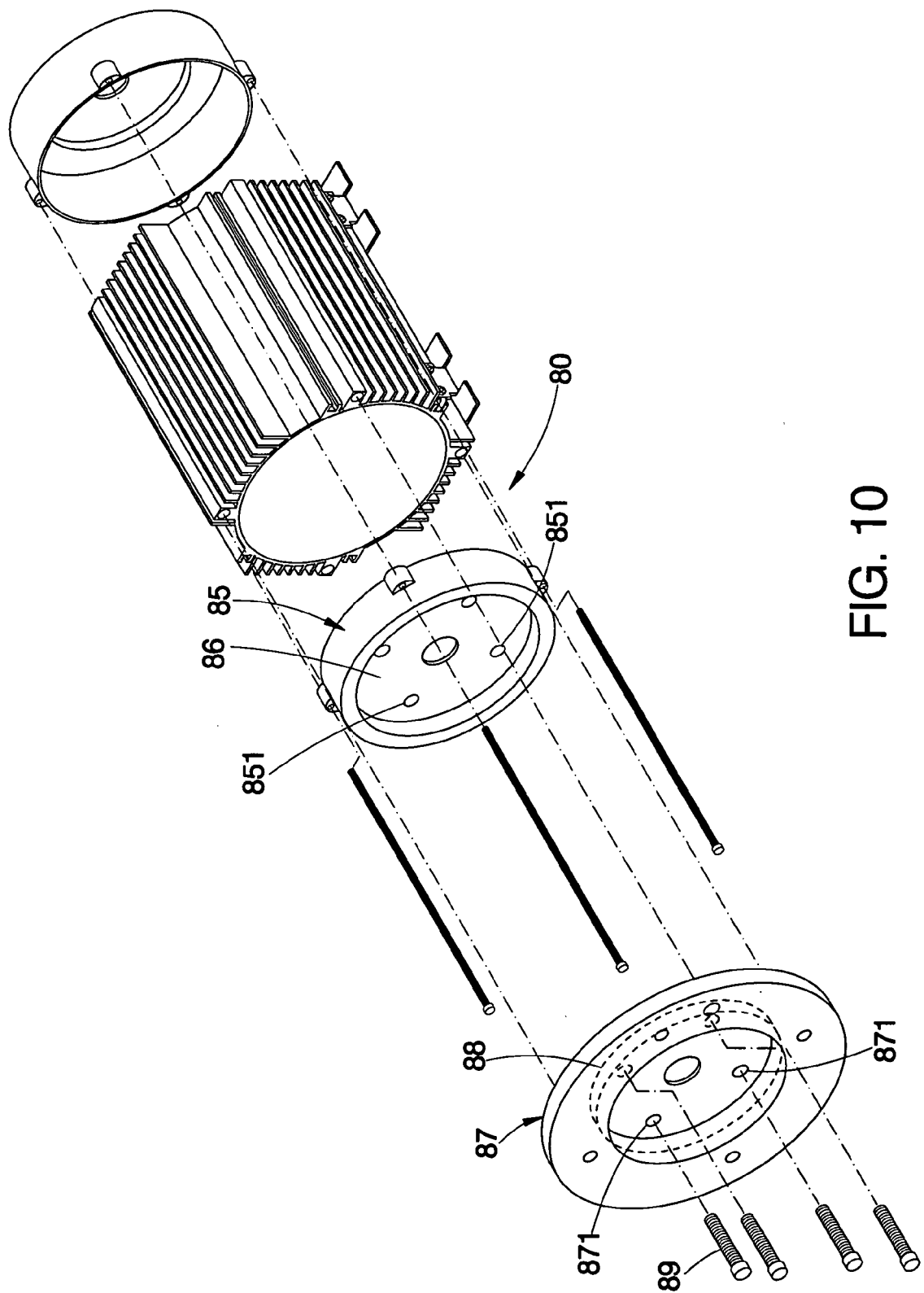
FIG. 10 is an exploded view of the fifth preferred embodiment of the present invention.

As shown in FIG. 9 and FIG. 10, a housing 80 of a motor of the fifth preferred embodiment is similar to the housing 10 of the first preferred embodiment, except that a front lid 85 has a recess 86 on an exterior end thereof and a front disk 87 has a plunge 88 to be engaged with the recess 86 of the front lid 85.

In addition, fasteners 89, which are bolts in the present preferred embodiment, are inserted into holes 871 of the front disk 87 and screwed into thread holes 851 of the front lid 85.

The way of how to mount the motor of the fifth preferred embodiment in vertical or in horizontal is as same as the motor of the first preferred embodiment, so that we would not describe again.

The advantages of the present invention are:

1. The motor with the housing of the present invention can be mounted both in vertical type and in horizontal type. The front disk is applied to mount the motor in vertical type and it is detached while the motor is mounted via the stand in horizontal type.

2. Because the present invention provides the front disk detachable, it does not have to provide a higher stand as the conventional one do. The motor with the housing of the present invention can be mounted in horizontal type while the front disk is detached. It overcomes the drawback of the conventional one as described in the background of the present specification.

3. The housing of the present invention only has one specification that meets both of the vertical motor and the horizontal motor. In other words, the motor with the front disk is the vertical motor and the motor without the front disk is the horizontal motor. It simplifies the procedure of manufacture and reduces the cost of storage.

The main scope of the present invention is that the detachable front disk is provided to make the motor can be the vertical motor or the horizontal motor. The way of how to fasten the front disk to the front lid is not restricted in the preferred embodiments. Any equivalent structure or device is still within the scope of the present invention.

What is claimed is:

1. A housing of a motor, comprising:
   a barrel having a plurality of fins on an outer surface thereof and a plurality of stands on a bottom of the outer surface for horizontally mounting the motor onto a predetermined plane;
   a rear lid mounted at a rear end of the barrel and having an axle hole at a center thereof;
   a front lid mounted at a front end of the barrel and having an axle hole at a center thereof; and
   a front disk having a diameter greater than that of the barrel and detachably fastened to said front lid through at least a fastener said front disk including a plurality of fastening holes for vertically mounting the motor onto a predetermined plane; and
   wherein the front lid has a hill portion at an exterior end thereof and a stop plane around the hill portion; the hill portion has a diameter smaller than the diameter of the barrel; and the front disk has a hole at a center thereof to be fitted to the hill portion of the front lid and attached on the stop plane.

2. The housing as defined in claim 1, wherein the barrel has a plurality of elongated ribs on the outer surface and between the fins, each of which has a thread hole at a front end thereof, and the front disk has a plurality of holes aligned to the thread holes respectively and the fasteners are bolts to be inserted into the holes of the front disk and screwed into the thread holes respectively.

3. The housing as defined in claim 1, wherein the front disk has a thread on a sidewall of the hole and the hill portion of the front lid had a thread whereby the front disk is fastened to the front lid via the engagement of the threads.

4. The housing as defined in claim 1, wherein the front lid has a plurality of flanges and front ends of the flanges and the stop plane are located a same plane whereby the front disk is attached on both of the stop plane and the flanges.

5. The housing as defined in claim 4, wherein the barrel has a plurality of elongated ribs on the outer surface and between the fins, each of which has a thread hole at a front end thereof, and each of the flanges have a hole aligned to the thread holes respectively and the fasteners are bolts to be inserted into the holes of the front disk and screwed into the thread holes respectively.

6. The housing as defined in claim 1, wherein an end of the front lid is a flat plane and an end of the front disk is a flat plane to be attached on the front lid.

7. The housing as defined in claim 1, wherein the front lid has a recess and the front disk has a plunge to be engaged with the recess.

* * * * *